(12) United States Patent
Petersen

(10) Patent No.: US 8,139,527 B2
(45) Date of Patent: Mar. 20, 2012

(54) WIRELESS SYSTEM WITH REDUCED EFFECT OF IQ IMBALANCE

(75) Inventor: James L. Petersen, Calgary (CA)

(73) Assignee: Wi-LAN, Inc., Ottawa, Ontario (CA)

( * ) Notice: Subject to any disclaimer, the term of this patent is extended or adjusted under 35 U.S.C. 154(b) by 948 days.

(21) Appl. No.: 11/960,637

(22) Filed: Dec. 19, 2007

(65) Prior Publication Data

US 2009/0161607 A1    Jun. 25, 2009

(51) Int. Cl.
*H04W 4/00*    (2009.01)
(52) U.S. Cl. ......................... 370/329; 370/341
(58) Field of Classification Search .................. 370/229, 370/329
See application file for complete search history.

(56) References Cited

U.S. PATENT DOCUMENTS

| | | | |
|---|---|---|---|
| 6,882,691 | B2 | 4/2005 | Chiodini |
| 7,106,689 | B1 | 9/2006 | Sudo |
| 7,139,536 | B2 | 11/2006 | Chiu |
| 7,167,513 | B2 | 1/2007 | Tsui et al. |
| 7,184,714 | B1 | 2/2007 | Kutagulla et al. |
| 7,224,744 | B2 | 5/2007 | Giannakis et al. |
| 7,274,750 | B1 | 9/2007 | Mueller |
| 2004/0125742 | A1 | 7/2004 | Schmidt |
| 2005/0207333 | A1 | 9/2005 | Rotstein et al. |
| 2005/0237989 | A1* | 10/2005 | Ahn et al. ................ 370/343 |
| 2006/0056554 | A1 | 3/2006 | Lin et al. |
| 2007/0081491 | A1 | 4/2007 | Kim et al. |
| 2007/0116139 | A1* | 5/2007 | Subramanian et al. ....... 375/260 |
| 2007/0171994 | A1* | 7/2007 | Parker et al. ................. 375/260 |
| 2007/0201398 | A1* | 8/2007 | Yang et al. ................... 370/329 |
| 2007/0259681 | A1 | 11/2007 | Cheng et al. |
| 2009/0016291 | A1* | 1/2009 | Oota et al. ................... 370/329 |

OTHER PUBLICATIONS

International Search Report for PCT Application No. PCT/US2008/087018 dated May 28, 2009.
Jia, et al., "On the Performance of IEEE 802.16 OFDMA System under Different Frequency Reuse and Subcarrier Permutation Patterns", Zhejiang University, Hangzhou 310027, China.
Wireless OFDM Systems: How to make them work?., Chapter 7, "Living with a real radio Impact of front-end effects".
Tubbax et al., "Compensation of IQ imbalance in OFDM systems" Boris Come, IMEC—Kapeldreef 75, 3001 Heverlee, Belgium.

* cited by examiner

*Primary Examiner* — Kenny Lin
*Assistant Examiner* — Shaq Taha
(74) *Attorney, Agent, or Firm* — Volpe and Koenig, P.C.

(57) ABSTRACT

In a wireless communication system, information is exchanged between a base station and a client station. The base station grants at least one allocation unit to a client station. The base station receives data from the client station using the allocation unit over the wireless link. The allocation unit substantially comprises mirror image pairs of subcarriers. Each mirror image pair of subcarriers includes a first subcarrier and a second subcarrier which are respectively disposed on opposite sides of a DC subcarrier by an equal frequency amount.

16 Claims, 7 Drawing Sheets

WIRELESS SYSTEM WITH REDUCED EFFECT OF IQ IMBALANCE

BACKGROUND OF THE INVENTION

The present disclosure relates generally to the field of digital wireless communication and, more particularly, to systems and methods for reducing the effects of interference in such communication.

Wireless communications systems of a cellular nature are well known, where a network entity in the form of a base station is responsible for communication with user equipment, or client stations, within the coverage area. When a client station moves from one coverage area to another coverage area, handover techniques ensure that the communication is not lost as responsibility is passed to a different base station.

One technique for handling multi-carrier transmissions is orthogonal frequency division multiplexing (OFDM). OFDM offers the advantages of improved downlink system capacity, coverage and data rates for packet data services with high spectral efficiency due to a nearly rectangular spectrum occupancy and low-cost implementation using the Fast Fourier Transform (FFT). It has been exploited for wideband data communications over mobile radio channels, high bit rate digital subscriber lines (HDSLs), asymmetric digital subscriber lines (ADSLs), digital broadcasting, and wireless local area network (WLAN) in IEEE 802.1 In and worldwide interoperability for microwave access (WIMAX) in IEEE 802.16, with mobility being supported in the IEEE 802.16e amendment to the standard.

SUMMARY OF THE INVENTION

In one aspect of the present disclosure, a wireless communication method includes assigning at least one allocation unit to a client station and receiving data using the allocation unit. The allocation unit substantially comprises mirror image pairs of subcarriers, each mirror image pair including a first subcarrier and a second subcarrier which are respectively disposed on opposite sides of a direct current (DC) subcarrier by an equal frequency amount.

In one embodiment, the allocation unit includes one or more pairs of physical tiles, each physical tile including a group of one or more subcarriers.

In one embodiment, the wireless communication method further includes assigning to a second client station at least one unpaired allocation unit substantially comprising unpaired subcarriers which have corresponding unused mirror image subcarriers respectively disposed on an opposite side of a direct current (DC) subcarrier from the unpaired subcarriers. The unused mirror image subcarriers are reserved to prevent their assignment to any other client station.

In another aspect, the present disclosure relates to a wireless communication method. The method includes receiving a grant of at least one allocation unit from a base station and transmitting data using the allocation unit. The allocation unit substantially comprises mirror image pairs of subcarriers, each mirror image pair including a first subcarrier and a second subcarrier which are respectively disposed on opposite sides of a direct current (DC) subcarrier by an equal frequency amount.

In another aspect of the present disclosure, an apparatus includes a processing module configured to process data exchanged between a base station and a client station and a radio interface module operatively coupled to the processing module. The radio interface module is configured to exchange data by receiving and transmitting the data over a wireless link. The data transmitted is at least partly transmitted on subcarriers of one or more assigned allocation unit. The assigned allocation unit substantially comprises mirror image pairs of subcarriers, each mirror image pair including a first subcarrier and a second subcarrier respectively disposed on opposite sides of a direct current (DC) subcarrier by an equal frequency amount.

In another aspect of the invention, an apparatus includes a processing module configured to process data exchanged between a base station and a client station and a radio interface module operatively coupled to the processing module. The radio interface module is configured to exchange data by receiving and transmitting the data over a wireless link. The data transmitted is at least partly transmitted on subcarriers of one or more assigned allocation unit. The assigned allocation unit substantially comprises mirror image pairs of subcarriers, each mirror image pair including a first subcarrier and a second subcarrier respectively disposed on opposite sides of a direct current (DC) subcarrier by an equal frequency amount.

In one embodiment, the one or more assigned allocation unit includes one or more pairs of physical tiles. Each physical tile includes a group of one or more subcarriers. The one or more allocation unit may include three pairs of physical tiles, each physical tile including a group of four subcarriers.

In one embodiment, the data received is at least partly received on subcarriers of one or more received allocation units. The received allocation units substantially comprise mirror image pairs of subcarriers, each mirror image pair including a first subcarrier and a second subcarrier respectively disposed on opposite sides of a direct current (DC) subcarrier by an equal frequency amount.

In another aspect, the present disclosure relates to an apparatus including a processing module configured to process data exchanged between a base station and a client station and a radio interface module operatively coupled to the processing module. The radio interface module is configured to exchange data by receiving and transmitting the data over a wireless link. The data received is at least partly transmitted by a client station on subcarriers of one or more assigned allocation unit. The assigned allocation unit substantially comprises mirror image pairs of subcarriers, each mirror image pair including a first subcarrier and a second subcarrier respectively disposed on opposite sides of a direct current (DC) subcarrier by an equal frequency amount.

In another aspect, the present disclosure relates to a software program embodied on a machine-readable medium. The software program is configured to provide a method including assigning at least one allocation unit to a client station. The allocation unit substantially comprises mirror image pairs of subcarriers, each mirror image pair including a first subcarrier and a second subcarrier which are respectively disposed on opposite sides of a direct current (DC) subcarrier by an equal frequency amount. The method further includes receiving data using the assigned allocation unit.

In another aspect of the present disclosure, an apparatus includes means for receiving a grant of at least one allocation unit from a base station and means for transmitting data using the assigned allocation unit. The allocation unit substantially comprises mirror image pairs of subcarriers, each mirror image pair including a first subcarrier and a second subcarrier which are respectively disposed on opposite sides of a direct current (DC) subcarrier by an equal frequency amount.

In another aspect of the present disclosure, a wireless communication apparatus includes means for assigning at least one allocation unit to a client station and means for receiving data using the assigned allocation unit. The allocation unit consists substantially of mirror image pairs of subcarriers, each mirror image pair including a first subcarrier and a second subcarrier which are respectively disposed on opposite sides of a direct current (DC) subcarrier by an equal frequency amount.

In another aspect, the present disclosure relates to a wireless communication method. The method includes assigning allocation units to a group of client stations and receiving transmitted data from the group of client stations via the assigned allocation units. The group of client stations includes a first subgroup of client stations having corresponding assigned allocation units that consist substantially of assigned subcarriers which have corresponding mirror image subcarriers respectively disposed on an opposite side of a direct current (DC) subcarrier from the assigned subcarriers. The mirror image subcarriers are reserved to prevent their assignment to any client station.

In one embodiment, the group of client stations includes a second subgroup of client stations having corresponding assigned allocation units that consist substantially of mirror image pairs of subcarriers. Each mirror image pair includes a first subcarrier and a second subcarrier respectively disposed on opposite sides of a direct current (DC) subcarrier by an equal frequency amount.

In another aspect of the present disclosure, a wireless communication method includes receiving a grant of a group of allocation units and transmitting data to the base station using the first subgroup of assigned allocation units. The group of allocation units includes a first subgroup of allocation unit substantially comprising assigned subcarriers which have corresponding mirror image subcarriers respectively disposed on an opposite side of a direct current (DC) subcarrier from the assigned subcarriers. The mirror image subcarriers are reserved by a base station to prevent their assignment to any other client station.

DETAILED DESCRIPTION OF THE PREFERRED EMBODIMENTS

Figure 1:
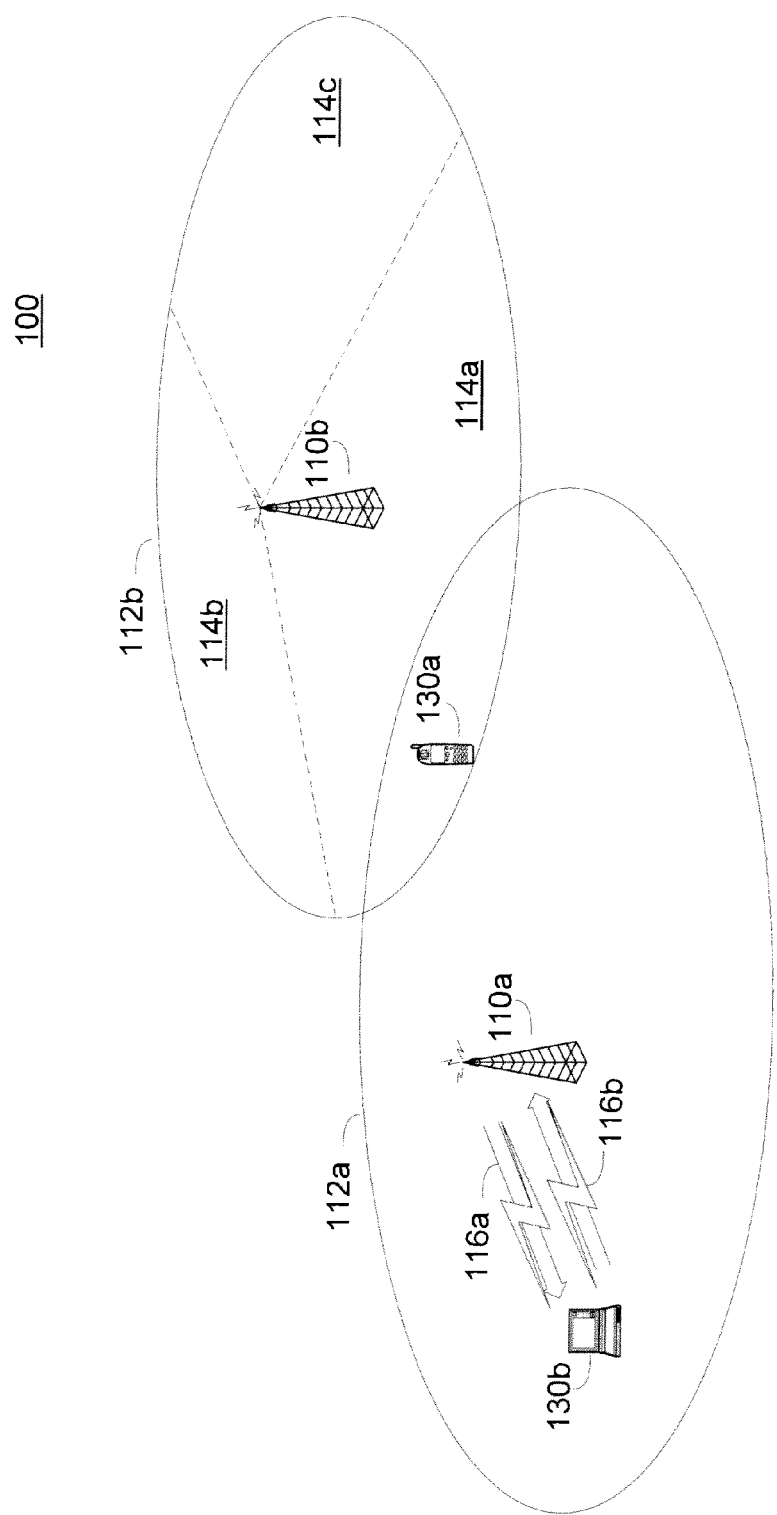
FIG. 1 is a simplified functional block diagram of an embodiment of a wireless communication system.

FIG. 1 is a simplified functional block diagram of an embodiment of a wireless communication system 100. The wireless communication system 100 includes a plurality of base stations 110a, 110b, each supporting a corresponding service or coverage area 112a, 112b. The base stations are capable of communicating with wireless devices within their coverage areas. For example, the first base station 110a is capable of wirelessly communicating with a first client station 130a and a second client station 130b within the coverage area 112a. The first client station 130a is also within coverage area 112b and is capable of communicating with the second base station 110b. In this description, the communications path from the base station to the client station is referred to as a downlink 116a, and the communications path from the client station to the base station is referred to as an uplink 116b.

Although for simplicity only two base stations are shown in FIG. 1, a typical wireless communication system includes a much larger number of base stations. In a typical system, the base stations 110a and 110b also communicate with each other over a backhaul network (not shown.) The backhaul network may include wired and wireless communications links, as well as supervisory network entities. The base stations 110a and 110b can also be configured as gateways, access points, radio frequency (RF) repeaters, frame repeaters, or nodes and include any wireless network entry point.

The base stations 110a and 110b can be configured to support an omni-directional coverage area or a sectored coverage area. For example, the second base station 110b is depicted as supporting a sectored coverage area 112b. The coverage area 112b is depicted as having three sectors, 114a, 114b, and 114c, each of which can also be referred to as a coverage area. In typical embodiments, the second base station 110b treats each sector, for example sector 114a, as effectively a distinct coverage area.

Although only two client stations 130a and 130b are shown in the wireless communication system 100, typical systems are configured to support a large number of client stations. The client stations 130a and 130b can be mobile, nomadic or stationary units. The client stations 130a and 130b are often referred to as, for example, mobile stations, mobile units, client stations, wireless terminals or the like. A client station can be, for example, a wireless handheld device, a vehicle mounted device, a portable device, client-premise equipment, a fixed-location device, a wireless plug-in accessory or the like. In some cases, a client station can take the form of a handheld computer, a notebook computer, a wireless telephone, a personal digital assistant, a wireless email device, a personal media player, meter reading equipment or the like.

In one example, the wireless communication system 100 is configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Long Term Evolution (LTE), or it may be a proprietary system. The ideas described herein are not limited to application to OFDMA systems. The description in the context of an OFDMA system is offered for the purposes of providing a particular example only.

Figure 2:
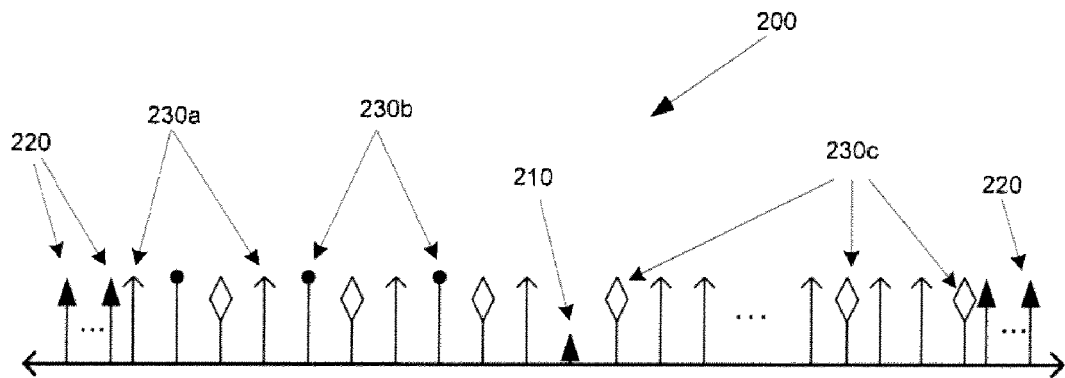
FIG. 2 illustrates an exemplary symbol structure in the frequency domain with a plurality of subcarriers.

Viewed in the frequency domain, an OFDMA symbol includes a set of discrete subcarriers in the region of the carrier frequency. Thus, in an OFDMA system, data is transmitted between a base station and a client station using a number of signals superimposed over a plurality of subcarriers. An exemplary symbol structure is illustrated in FIG. 2 in the frequency domain. Each vertical line along the frequency spectrum represents a discrete subcarrier, each subcarrier having energy concentrated within a limited frequency bandwidth with minimal overlap with the bandwith of an adjacent subcarrier. The set of subcarriers are generally centered around the subcarrier associated with the carrier frequency of the symbol, the DC subcarrier 210. Each symbol may have a number of subcarriers, the number being associated with the FFT size.

The set of subcarriers includes used subcarriers and null subcarriers. The null subcarriers include the DC subcarrier 210 and guard carriers 220 (indicated in FIG. 2 with a solid arrow head). The remaining carriers, or the so-called used carriers, can be used for the transmission of data and/or overhead.

For uplink communication, in conventional OFDMA systems, the base station allocates an uplink resource to a client station. In response, the client station uses the resource to send information to the base station. To reduce overhead, the base station does not designate resources on an individual subcarrier basis. Instead, the base station designates a group of subcarriers, called an allocation unit, for use by a client station.

The manner in which the subcarriers are assigned to an allocation unit is referred to as a permutation. IEEE 802.16e defines several permutation schemes including partial use of subchannels (PUSC), full use of subchannels (FUSC) and adaptive modulation and coding (AMC), as well as several others. (See 802.16e-2005, Section 8.4 and subparts, which is hereby incorporated by reference.)

According to PUSC and FUSC permutation schemes defined by 802.16e, the subcarriers assigned to any one client station are spread throughout the frequency band. For example, for downlink communication, the subcarriers assigned to a particular allocation unit are spread throughout the band. In the illustration of FIG. 2, subcarriers belonging to the same allocation unit are illustrated with the same line end. For example, a first allocation unit 230a consists of subcarriers indicated by an open arrow head, while subcarriers comprising a second allocation unit 230b are indicated by a closed dot, and subcarriers comprising a third allocation unit 230c are indicated by a diamond line end.

The purpose of assigning subcarriers spread throughout the frequency band, thereby scattering the energy throughout the frequency band, is to provide frequency diversity. In this regard, immunity of the system is increased to frequency fading, as is well known in the art. IEEE 802.16e-2005 defines a pseudo-random scheme for determining which subcarriers are assigned to a common allocation unit on the downlink and uplink. (See 802.16e-2005, Section 8.4 and subparts.)

OFDMA systems generally utilize analog in-phase (I) and quadrature (Q) modulators and demodulators. The analog nature of these modulators and demodulators can lead to an IQ imbalance. An IQ imbalance arises when I-path front-end components and Q-path front-end components introduce an amplitude mismatch, phase mismatch or both between the two paths. The negative effects of an IQ imbalance in OFDM systems are well known to those skilled in the art and are well documented in the literature. See e.g., Engels, Marc. *Wireless OFDM Systems: How to make them work?*, Chapter 7, Boston: Kluwer Academic Publishers (2002), which is incorporated by reference in its entirety.

One negative effect of an IQ imbalance in an OFDM system is the creation of interference at a mirror image frequency. The mirror image frequencies are respectively disposed on opposite sides of a direct current (DC) subcarrier by an equal frequency amount. Referring again to FIG. 2, a client station assigned the second allocation unit 230b uses the third subcarrier on the left side of the DC subcarrier 210. Since the third subcarrier on the right side of the DC subcarrier 210 is assigned to the first allocation unit 230a, interference may be created with another client station which has been assigned the first allocation unit 230a. A larger IQ imbalance creates more interference at the mirror image than does a smaller IQ imbalance.

Thus, when a first client station with an IQ imbalance is assigned an allocation unit including a subcarrier to the left of the DC subcarrier 210, the first client station creates interference in the mirror image subcarrier on the right side of the DC subcarrier 210. Such interference is typically notated as "Negative Frequency Rejection" (NFR) and is specified in terms of the ratio of the power of the interfering signal to the power of the desired signal.

The magnitude of the effects of the IQ imbalance are illustrated by the following example. In this example, a first client station is operating close to the base station and is at the upper end of the power control tolerance. Its signal reaches the base station at a fairly high power level and causes a corresponding large interfering signal at the mirror image frequency. The subcarrier corresponding to the mirror image frequency is assigned to a second client station. The second client station is operating at the lower end of the power control tolerance or is otherwise power constrained, resulting in its signal reaching the base station at a fairly low power level. In this example, the ratio of the power in the interfering signal to the power of the desired signal can be quite high, and the effect of the interference caused by the IQ imbalance of the first client station on the performance of the second client station can be significant. This problem is referred to herein as a loud/quiet IQ imbalance interference issue.

In accordance with embodiments of the present disclosure, exchange of data between a base station and a client station is achieved while reducing the effects of IQ imbalance. In this regard, exchange of data may include transmission of data from the base station for receipt by the client station (downlink) or from the client station for receipt by the base station (uplink). Such exchange of data may reduce the effects of IQ imbalance and, in particular, eliminate the loud/quiet IQ imbalance interference issue by using permutation schemes which assign mirror image subcarriers to a common client station. In one embodiment, an allocation unit assigned for the exchange of data consists substantially of mirror image pairs of subcarriers.

Figure 3:
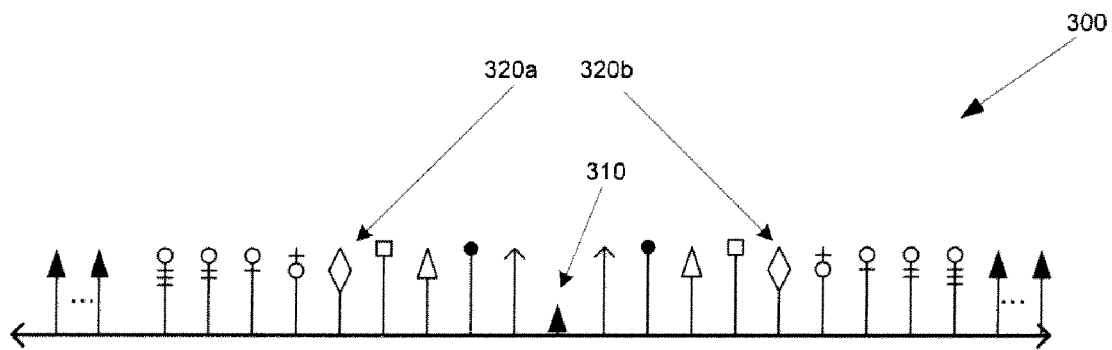
FIG. 3 illustrates a symbol structure according to an embodiment of the present disclosure.

An exemplary embodiment of a symbol structure implementing such a permutation scheme is illustrated in FIG. 3. In the illustrated embodiment, an allocation unit is assigned a first subcarrier 320a on the left side of the DC carrier 310 and a second subcarrier 320b on the right side. The second subcarrier 320b is the mirror image subcarrier of the first subcarrier 320a. Additional image pairs (as indicated in FIG. 3 by common line ends) of subcarriers may be assigned to the same allocation unit. Thus, mirror image subcarriers are systematically assigned to a common allocation unit and to a common client station such that an allocation unit comprises mirror image pairs of subcarriers. In one embodiment, most or all subcarriers in an allocation unit are assigned in mirror image pairs. Thus, an allocation unit substantially comprised of mirror-image pairs of subcarriers.

Thus, in accordance with embodiments of the present disclosure, the loud/quiet IQ imbalance interference issue is mitigated. Under a mirror-image permutation scheme, a client station IQ imbalance mainly causes interference to another subcarrier associated with the same client station. The power level of the subcarriers of a common client station is substantially the same. As a result, the ratio of the power of the interfering signal to the power of the desired signal remains fairly uniform over a large range of operating conditions, and the loud/quiet IQ imbalance interference issue is avoided.

In a typical wireless communication system, when the base station assigns an uplink resource to a client station, it assigns one or more allocation units for use by the client station. Typically only a small portion of the available allocation units are assigned to one client station and the remaining allocation units are assigned to other client stations operating in the same system. In this way, access to the system can be fairly shared among the client stations using the system at any given time.

Figure 4:
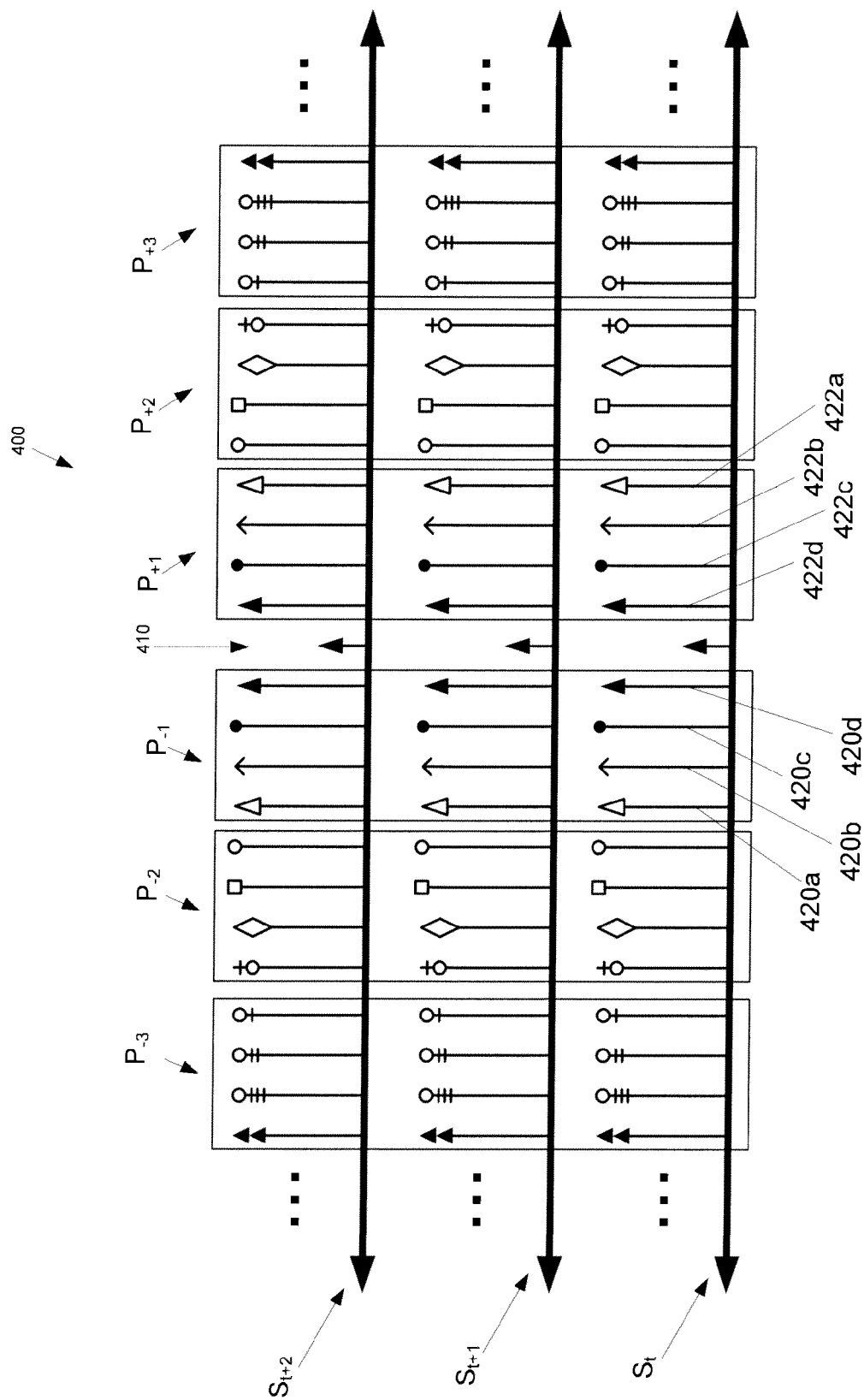
FIG. 4 illustrates a physical tile structure according to an embodiment of the present disclosure.

In one embodiment, as illustrated in FIG. 4, each allocation unit includes one or more pairs of physical layer tiles, referred to herein as tiles or physical tiles. Each tile includes a group of one or more subcarriers and may span more than one symbol. In one particular embodiment, a mode of the uplink of an IEEE 802.16e system uses a 1024-point FFT, resulting in 1024 subcarriers per symbol. After the removal of null subcarriers, the remaining subcarriers are divided into 35 allocation units. Each allocation unit is made up of six physical tiles, each of which spans more than one symbol. As illustrated in FIG. 4, four subcarriers 420a-d from each of three successive symbols $S_i$ (such as $S_t$, $S_{t+2}$ and $S_{t+2}$) are combined to form one physical tile $P_k$ (such as $P_{-3}$). Six physical tiles $P_k$ are combined to form one allocation unit. While conventional systems call for the six physical tiles associated with any one allocation unit to be pseudo randomly selected (e.g., without regard to the frequency symmetry), embodiments of the present disclosure dictate that mirror image physical tiles are mapped into one allocation unit so that mirror image subcarriers are assigned to one client station. Accordingly, as illustrated in FIG. 4, physical tile $P_{+k}$ and physical tile $P_{-k}$ are assigned to a common allocation unit.

In one embodiment, if the resource demand from the client stations is sufficiently low, the base station may assign allocation units such that only one of each mirror image pair is used. The mirror images of the subcarriers of the assigned allocation unit are not assigned to either the same client station or to a different client station. In this way, the negative effects of IQ imbalance are avoided. For example, one way to implement such a system would be to define the allocation units to include subcarriers from only one side of the DC subcarrier.

Thus, in one example, if less than half of the available physical tiles of FIG. 4 are required to satisfy the uplink demand, the base station may assign physical tile $P_{-3}$ to a first client station, $P_{-1}$ to a second client station and $P_{+2}$ to a third client station. The mirror images of those physical tiles ($P_{+3}$, $P_{+1}$ and $P_{-2}$) are not assigned to any client station. Since the mirror image tiles are not used, the loud/quiet IQ imbalance is completely avoided.

If the resource requirement increases beyond the ability to avoid use of mirror image subcarriers, the base station may revert, at least partially, to the mirror-image permutation described above. In one embodiment, at least some of the mirror image subcarriers are not assigned to any client station, while at least some of the mirror image subcarriers are assigned to the same client station to form mirror-image pairs. For example, the group of client stations currently being serviced may be divided into two sets. The first set of client stations transmit data over allocation units consisting substantially of mirror image pairs. The second set of client stations transmits data on allocation units consisting substantially of subcarriers whose mirror image subcarriers are not assigned to any client station. In one embodiment, a single client station is granted some allocations substantially comprising mirror image pairs of subcarriers and is also granted allocation units substantially comprising unpaired subcarriers, the unimpaired subcarriers having corresponding unused mirror image subcarriers that are reserved to prevent their assignment to any other client station.

Figure 5:
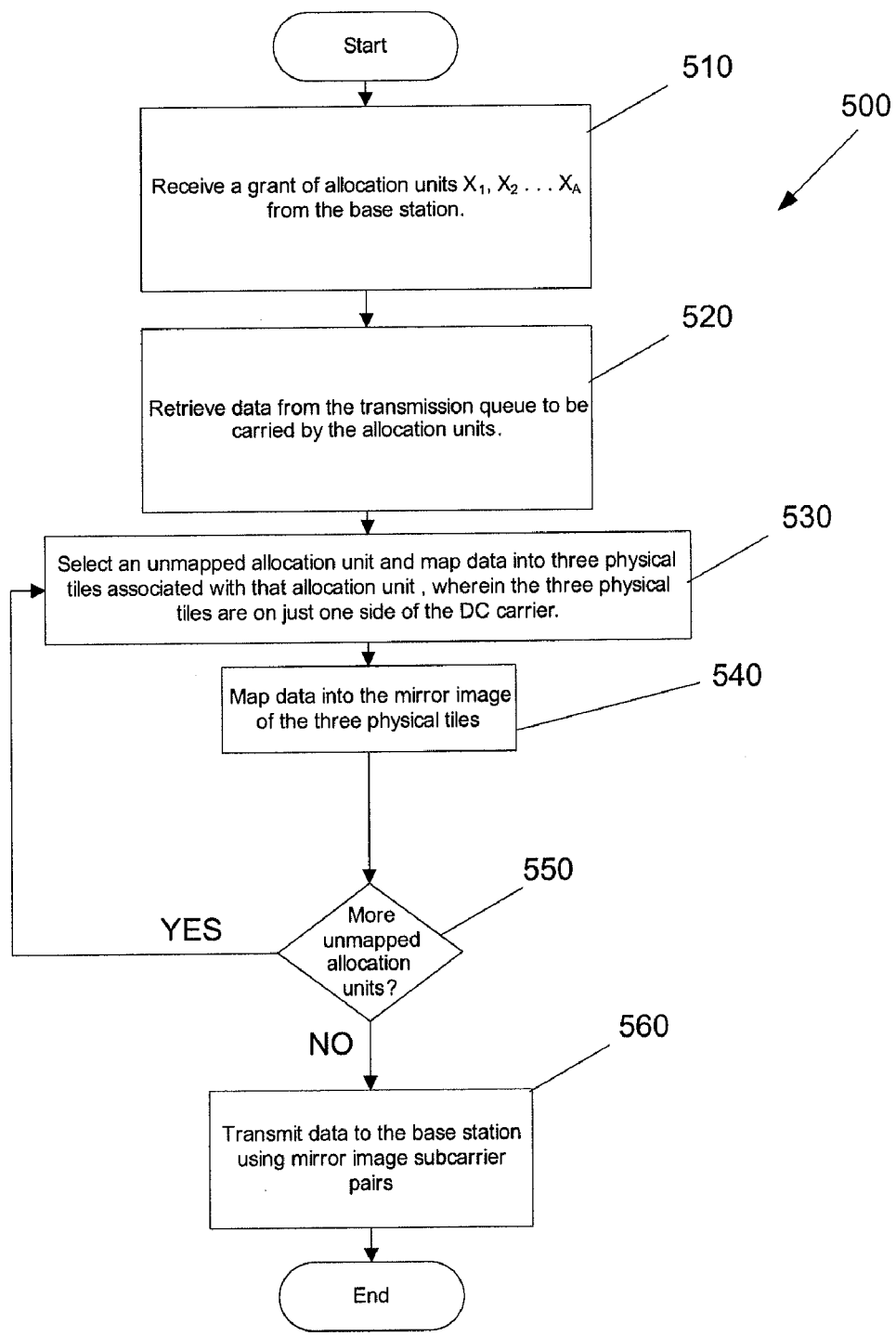
FIG. 5 illustrates a flow chart implementing a method according to an embodiment of the present disclosure.

Referring now to FIG. 5, a flowchart illustrating a communication method 500 in accordance with an embodiment of the present disclosure is provided. While FIG. 5 exemplarily illustrates an implementation of an embodiment of the present disclosure for an uplink transmission, those skilled in the art will understand that a downlink communication may be similarly implemented and is contemplated within the scope of the present disclosure.

In accordance with the process, the client station (such as a mobile wireless device) receives a grant of allocation units (X) from the base station (block 510). In this regard, the base station identifies one or more of the 35 available allocation units for use by the client station. In this regard, the base station may include a controller or an allocation module adapted to identify, track and manage the allocation units assigned to various client stations. In one embodiment, each allocation unit is made up of six physical tiles. All base stations and client stations in the system equate a specific allocation unit with six, unique physical tiles. The client station retrieves data from the transmission queue to be carried by the allocation units (block 520). The client station may include a controller or a communication module to manage communication, including retrieval of data from the transmission queue.

As noted above, in conventional communication systems, the mapping from allocation units to physical tiles is done pseudo randomly, without regard to frequency symmetry. In accordance with embodiments of the present disclosure, mirror-image subcarrier pairs are mapped into one allocation unit. One embodiment of a mapping scheme is illustrated in FIG. 5 and described below.

For purposes of simplifying the description, the set of all physical tiles is divided into two subsets. The first subset includes one half the total number of physical tiles and is made up of physical tiles on just one side of the DC subcarrier. The second subset includes one half the total number of physical tiles and is made up of physical tiles on the other side of the DC subcarrier. With reference to FIG. 4, the first subset may refer to physical tiles $P_{-1}$, $P_{-2}$ and $P_{-3}$, while the second subset refers to physical tiles $P_{+1}$, $P_{+2}$ and $P_{+3}$. Also for ease of description, the client station (or a module therein) is assumed to process the allocation units one at a time. Those skilled in the art will understand that a client station may process allocation units in other manners and such manners are contemplated within the scope of the present disclosure.

Referring again to FIG. 5, at block 530, the client station selects one of the unprocessed allocation units and maps data into three physical tiles from the first subset. In the embodiment of FIG. 4, the data is mapped onto physical tiles $P_{-1}$, $P_{-2}$ and $P_{-3}$. The mapping can be done by an interleaving algorithm, pseudorandom number generation, look up table, renumbering, or any deterministic manner. In this regard, the mapping is deterministic to ensure that the base station and other client stations are using the same mapping scheme. Again, the client station may be provided with a controller or a module to perform the mapping.

At block 540, data is mapped into three additional physical tiles from the second subset, wherein each additional physical tile is the mirror image tile of a tile into which data was mapped at block 530. Referring again to the embodiment illustrated in FIG. 4, data is mapped onto the mirror-image tiles on the right side, $P_{+1}$, $P_{+2}$ and $P_{+3}$.

Once data has been mapped to each of the six tiles of the allocation unit, the client station determines whether data has been mapped into all allocation units (block 550). If additional allocation units remain and have not been mapped, the process returns to block 530 for mapping of data into pairs of physical tiles. Thus, blocks 530 and 540 may be repeated as often as necessary for mapping of all assigned allocation units.

On the other hand, if the determination is made at block 550 that all allocation units have been mapped, the process proceeds to block 560, and the client station transmits the data over the wireless link using the mirror-image subcarrier pairs.

While FIG. 5 and the above description relate to an uplink communication, those skilled in the art will understand that a mirror-image permutation scheme may also be applied to the downlink and is contemplated within the scope of the present disclosure. It is noted that the effects of the IQ imbalance are typically less for downlink communication than for uplink communication. Since the base station transmits all subcarriers at the same power level, the downlink communication is less affected by the loud/quiet IQ imbalance interference issue.

For downlink communication, the base station may assign allocation units for the communication and may map the data into the allocation units in a manner similar to that described above. A lookup table may be used to facilitate selection of the mapping. As noted above, the base station and the client stations may have a priori agreement on the selection of such mapping.

Figure 6:
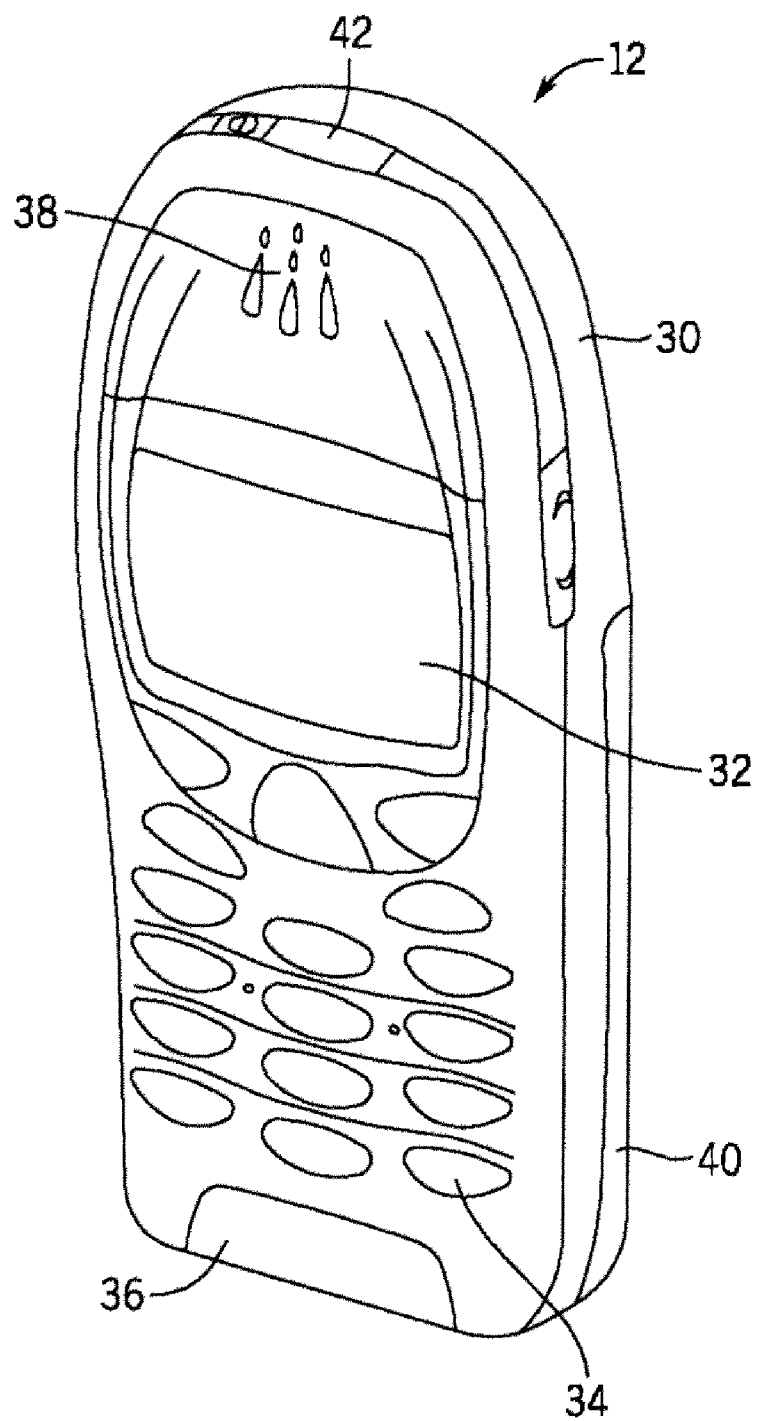
FIG. 6 is a perspective view of an electronic device that can be used in conjunction with the implementation of various embodiments.
Figure 7:
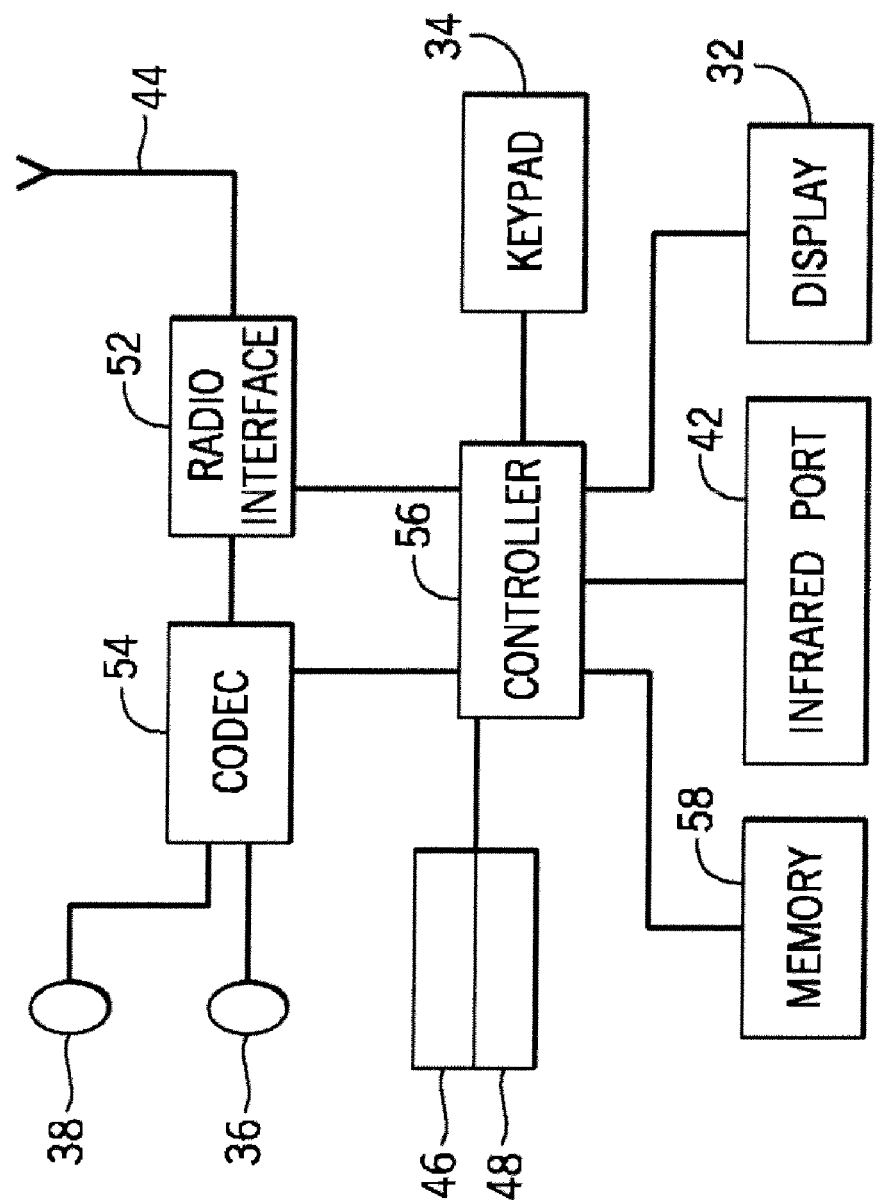
FIG. 7 is a schematic representation of the circuitry which may be included in the electronic device of FIG. 6.

FIGS. 6 and 7 show one representative electronic device 12 which may serve as a client station and within which embodiments of the present disclosure may be implemented. It should be understood, however, that the present disclosure is not intended to be limited to one particular type of electronic device 12. The electronic device 12 of FIGS. 6 and 7 includes a housing 30 which forms the exterior of the device. The housing 30 may protect certain components from the external environment and provides a user with access to other components. A display 32 is provided in the form of a liquid crystal display, for example, to allow the user to view text, images, video and the like.

A keypad 34 and a microphone 36 allow user inputs to be received by the electronic device 12. The keypad 34 may be used to enter alphanumeric inputs by the user, while the microphone 36 may be used to either provide audio inputs to the electronic device 12 or to allow the user to verbally communicate through a network. An ear-piece 38 allows a user to verbally communicate with another user. The electronic device 12 is powered by a battery 40, which is preferably a rechargeable battery. The microphone 36 and the ear piece 38 may be coupled to codec circuitry 54, which may be coupled to a device controller 56 and a radio interface 52.

An infrared port 42 may be provided to allow communication with nearby devices, for example. The electronic device 12 may communicate with a network through, for example, a base station via radio communication which may be facilitated by an antenna 44. The antenna 44 may be tuned for communication at one or more ranges of frequencies. The antenna 44 may be coupled to the radio interface circuitry 52, which is coupled to the controller 56 and the codec circuitry 54. In this regard, the controller 56 may be a central processing unit for controlling the operation of the electronic device 12.

The radio interface circuitry 52 receives the downlink 116a signaling from the base station (see FIG. 1) through the antenna 44, converts the signaling to digital form and provides it to the controller 56. The controller 56 parses the signaling in its digital form. For example, a controller 56 may include a processing module which determines the allocation units assigned to the client station 12 as part of executing step 510 of FIG. 5. The processing module may be implemented at least partially by a processor executing code, an application-specific integrated circuit (ASIC), a digital signal processor (DSP), an embedded processor, a field programmable gate array (FPGA) or the like.

Likewise the controller 56 creates a digital version of the signal to be transmitted over the uplink 116b (see FIG. 1). For example the processing module within the controller 56 maps data onto the allocation units as part of executing steps 520, 530, 540, 550 and 560 of FIG. 5, thereby creating an uplink signal consisting substantially of mirror image pairs of subcarriers. The processing module provides the digital version of the signal to the radio interface 52 which converts the signal into a format appropriate for transmission over the uplink 116a via the antenna 44, such as, for example, as part of executing step 560 of FIG. 5

In one embodiment, the processing module within the device controller 56 determines the down link allocation units to be used by the base station to the client station 12. The processing module may determine that some of the down link allocation units assigned to it consists substantially of mirror image pairs of subcarriers. The processing module may determine that some of the down link allocation unit consists substantially of subcarriers whose mirror image subcarriers are not assigned to any client station.

The electronic device 12 may be adapted to incorporate a smart card 46 to identify the user and to provide secure communication, for example. A card reader 48 may be provided to read the smart card 46 and to relay the information from the smart card 46 to the device controller 56. A storage unit, such as memory 58, may be provided to store data (e.g., contact list) or programs to be accessed by the controller 56.

Figure 8:
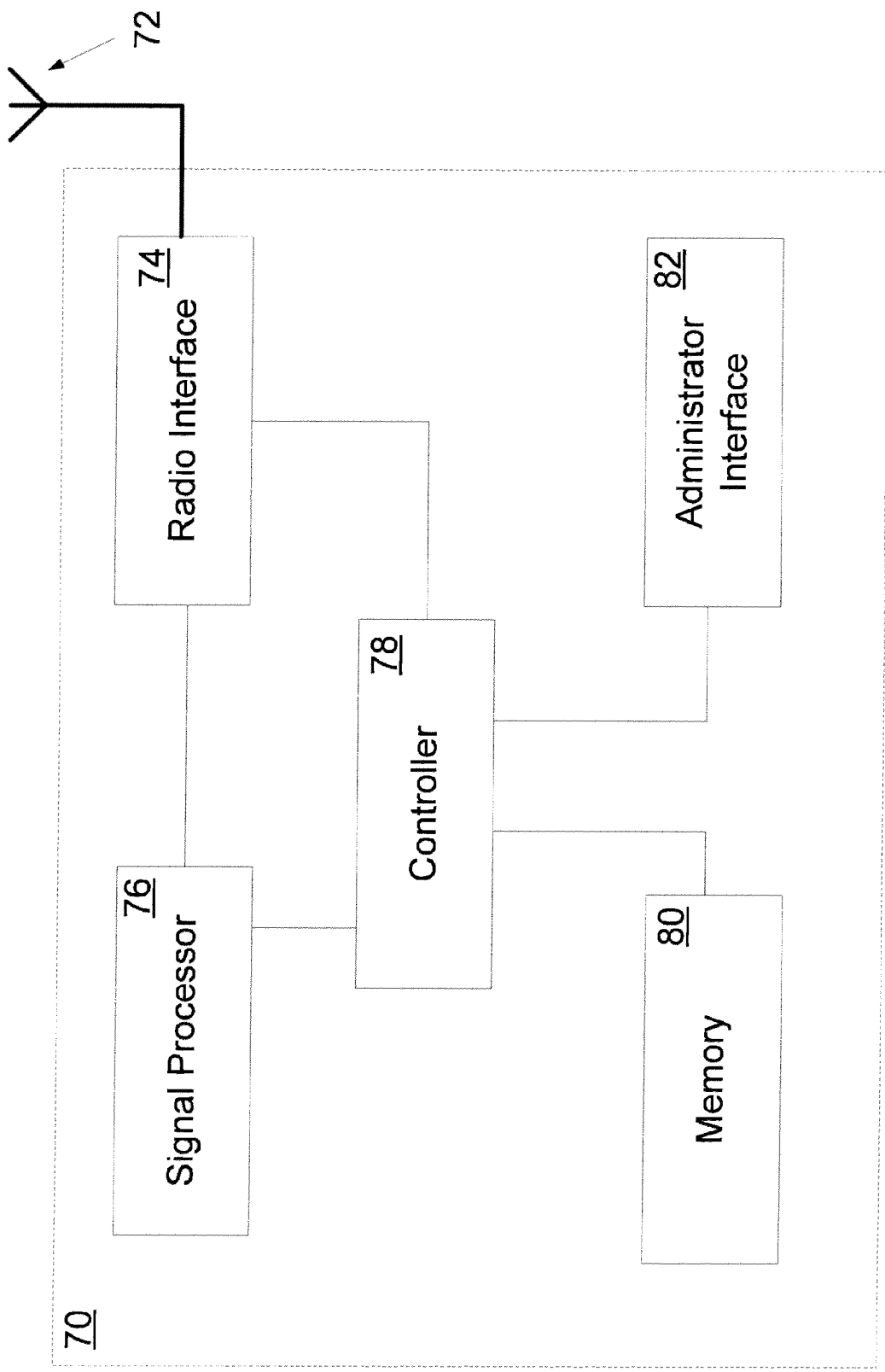
FIG. 8 is a schematic representation of a base station.

FIG. 8 illustrates an exemplary, simplified block diagram of a base station 70 according to an embodiment of the present disclosure. The base station 70 includes an antenna 72 adapted to receive uplink 16b signaling and transmit downlink 16a signaling for communication with a client station. As with the electronic device 12 described above with reference to FIGS. 6 and 7, the antenna 72 and radio interface module 74 of the base station 70 may be tuned for communication at one or more ranges of frequencies.

A processing module 76 is coupled to the radio interface module 74. The processing module 76 can determine the allocation units which are assigned to a particular client station for use on the uplink. The processing module 76 creates a grant message for transmission to the client station indicating the assigned allocation units. In one embodiment of the present disclosure, the processing module 76 grants allocation units to a client station which consist substantially of mirror image pairs of subcarriers. In addition, the processing module 76 may grant allocation units to one or more client stations which consist substantially of subcarriers whose mirror image subcarriers are not assigned to any client station.

In one embodiment, the processing module 76 determines the allocation units to be used by the base station 70 to transmit information from the base station 70 to the client station. The processing module 76 may use allocation units which consist substantially of mirror image pairs of subcarriers. In one embodiment, the processing module 76 uses allocation units which consist substantially of subcarriers whose mirror image subcarriers are not assigned to any client station.

A signal processor module 76 may be coupled to the radio interface module 74 to aid in the processing of signals received from client stations or to be transmitted to the client stations. In this regard, the signal processor module 76 may be adapted to code or decode communication signals.

The signal processor module 76 and the radio interface module 74 may be coupled to a controller module 78 adapted to control the operation of the base station 70. In this regard, the controller module 78 may be a central processing unit. A memory module 80 may be provided to store data and programs to be accessed by the controller 78. In order to facilitate maintenance, repair or upgrading of the base station 70 and its various modules, an administrator interface 82 may be provided. The administrator interface 82 may include a keyboard or other input device. The administrator interface 82 may also include an output device, such as a monitor or a printer, to facilitate diagnostic operations.

Various embodiments described herein are described in the general context of method steps or processes, which may be implemented in one embodiment by a software program product or component, embodied in a machine-readable medium, including executable instructions, such as program code, executed by entities in networked environments. Generally, program modules may include routines, programs, objects, components, data structures, etc. that perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various embodiments of the present disclosure can be accomplished with standard programming techniques with rule-based logic and other logic to accomplish various database searching steps or processes, correlation steps or processes, comparison steps or processes and decision steps or processes. It should be noted that the word "module," as used herein and in the following claims, is intended to encompass implementations using one or more lines of software code, and/or hardware implementations, and/or equipment for receiving manual inputs.

The foregoing description of various embodiments have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A wireless communication method, comprising:
assigning at least one allocation unit to a client station, the allocation unit substantially comprising mirror image pairs of subcarriers, each mirror image pair including a first subcarrier and a second subcarrier which are respectively disposed on opposite sides of a direct current (DC) subcarrier by an equal frequency amount; and
receiving data using the allocation unit.

2. The method of claim 1, wherein the allocation unit includes at least one pair of physical tiles, each physical tile including a group of at least one subcarrier.

3. The method of claim 1, further comprising:
assigning to a second client station at least one unpaired allocation unit substantially comprising unpaired subcarriers which have corresponding unused mirror image subcarriers respectively disposed on an opposite side of a direct current (DC) subcarrier from the unpaired subcarriers, the unused mirror image subcarriers being reserved to prevent their assignment to any other client station.

4. A wireless communication method, comprising:
receiving a grant of at least one allocation unit from a base station, the allocation unit substantially comprising mirror image pairs of subcarriers, each mirror image pair including a first subcarrier and a second subcarrier which are respectively disposed on opposite sides of a direct current (DC) subcarrier by an equal frequency amount; and
transmitting data using the allocation unit.

5. An apparatus, comprising
a processing module configured to process data exchanged between a base station and a client station; and
a radio interface module operatively coupled to the processing module and configured to exchange data by receiving and transmitting the data over a wireless link, the data transmitted being at least partly transmitted on subcarriers of at least one assigned allocation unit, the assigned allocation unit substantially comprising mirror image pairs of subcarriers, each mirror image pair including a first subcarrier and a second subcarrier respectively disposed on opposite sides of a direct current (DC) subcarrier by an equal frequency amount.

6. The apparatus of claim 5, wherein the at least one assigned allocation unit includes at least one pair of physical tiles, each physical tile including a group of at least one subcarrier.

7. The apparatus of claim 6, wherein the at least one allocation unit includes three pairs of physical tiles, each physical tile including a group of four subcarriers.

8. The apparatus of claim 5, wherein the data received is at least partly received on subcarriers of at least one received allocation unit, the received allocation units substantially comprising mirror image pairs of subcarriers, each mirror image pair including a first subcarrier and a second subcarrier respectively disposed on opposite sides of a direct current (DC) subcarrier by an equal frequency amount.

9. An apparatus, comprising:
a processing module configured to process data exchanged between a base station and a client station;
a radio interface module operatively coupled to the processing module and configured to exchange data by receiving and transmitting the data over a wireless link, the data received being at least partly transmitted by a client station on subcarriers of at least one assigned allocation unit, the assigned allocation unit substantially comprising mirror image pairs of subcarriers, each mirror image pair including a first subcarrier and a second subcarrier respectively disposed on opposite sides of a direct current (DC) subcarrier by an equal frequency amount.

10. A non-transitory machine-readable storage medium storing a set of instructions for execution by one or more processors, the set of instructions comprising:
an assigning code segment for assigning at least one allocation unit to a client station, the allocation unit substantially comprising mirror image pairs of subcarriers, each mirror image pair including a first subcarrier and a second subcarrier which are respectively disposed on opposite sides of a direct current (DC) subcarrier by an equal frequency amount; and a receiving code segment for receiving data using the assigned allocation unit.

11. An apparatus, comprising:

means for receiving a grant of at least one allocation unit from a base station, the allocation unit substantially comprising mirror image pairs of subcarriers, each mirror image pair including a first subcarrier and a second subcarrier which are respectively disposed on opposite sides of a direct current (DC) subcarrier by an equal frequency amount; and means for transmitting data using the assigned allocation unit.

12. A wireless communication apparatus, comprising:

means for assigning at least one allocation unit to a client station, the allocation unit substantially comprising mirror image pairs of subcarriers, each mirror image pair including a first subcarrier and a second subcarrier which are respectively disposed on opposite sides of a direct current (DC) subcarrier by an equal frequency amount; and means for receiving data using the assigned allocation unit.

13. A wireless communication method, comprising:

assigning allocation units to a group of client stations, the group of client stations including a first subgroup of client stations having corresponding assigned allocation units that consist substantially of assigned subcarriers which have corresponding mirror image subcarriers respectively disposed on an opposite side of a direct current (DC) subcarrier from the assigned subcarriers, the mirror image subcarriers being reserved to prevent their assignment to any client station; and receiving transmitted data from the group of client stations via the assigned allocation units.

14. The method of claim 13, wherein the group of client stations including a second subgroup of client stations having corresponding assigned allocation units that consist substantially of mirror image pairs of subcarriers, each mirror image pair including a first subcarrier and a second subcarrier respectively disposed on opposite sides of a direct current (DC) subcarrier by an equal frequency amount.

15. A wireless communication method, comprising:

receiving a grant of a group of allocation units, the group of allocation units including a first subgroup of allocation unit substantially comprising assigned subcarriers which have corresponding mirror image subcarriers respectively disposed on an opposite side of a direct current (DC) subcarrier from the assigned subcarriers, the mirror image subcarriers being reserved by a base station to prevent their assignment to any other client station; and transmitting data to the base station using the first sub group of assigned allocation units.

16. The method of claim 15, wherein the group of allocation units including a second subgroup of allocation units substantially comprising mirror image pairs of subcarriers.

* * * * *